(12) United States Patent
Wu et al.

(10) Patent No.: US 11,008,490 B2
(45) Date of Patent: *May 18, 2021

(54) TWO-COMPONENT SOLVENTLESS ADHESIVE COMPOSITIONS COMPRISING AN AMINE-INITIATED POLYOL

(71) Applicant: Dow Global Technologies LLC, Midland, MI (US)

(72) Inventors: Jie Wu, Freeport, TX (US); Rui Xie, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/300,558

(22) PCT Filed: Apr. 25, 2017

(86) PCT No.: PCT/US2017/029290
§ 371 (c)(1),
(2) Date: Nov. 10, 2018

(87) PCT Pub. No.: WO2017/196529
PCT Pub. Date: Nov. 16, 2017

(65) Prior Publication Data
US 2019/0284456 A1  Sep. 19, 2019

Related U.S. Application Data

(60) Provisional application No. 62/333,877, filed on May 10, 2016.

(51) Int. Cl.
| | | |
|---|---|---|
| *B32B 27/40* | (2006.01) |
| *C08G 18/38* | (2006.01) |
| *C09J 175/12* | (2006.01) |
| *C09J 175/04* | (2006.01) |
| *B32B 7/12* | (2006.01) |
| *C08G 18/10* | (2006.01) |
| *C08G 18/50* | (2006.01) |
| *C08G 18/71* | (2006.01) |
| *C08G 18/73* | (2006.01) |
| *C08G 18/76* | (2006.01) |
| *B32B 15/04* | (2006.01) |
| *B32B 21/04* | (2006.01) |
| *B32B 27/32* | (2006.01) |
| *B32B 15/14* | (2006.01) |
| *B32B 27/08* | (2006.01) |
| *B32B 29/00* | (2006.01) |
| *B32B 15/10* | (2006.01) |
| *B32B 29/02* | (2006.01) |
| *B32B 27/12* | (2006.01) |
| *B32B 5/26* | (2006.01) |
| *B32B 21/06* | (2006.01) |
| *B32B 21/10* | (2006.01) |

(Continued)

(52) U.S. Cl.
CPC ............ *C09J 175/04* (2013.01); *B32B 5/022* (2013.01); *B32B 5/024* (2013.01); *B32B 5/26* (2013.01); *B32B 7/12* (2013.01); *B32B 15/043* (2013.01); *B32B 15/08* (2013.01); *B32B 15/10* (2013.01); *B32B 15/12* (2013.01); *B32B 15/14* (2013.01); *B32B 21/042* (2013.01); *B32B 21/06* (2013.01); *B32B 21/08* (2013.01); *B32B 21/10* (2013.01); *B32B 27/08* (2013.01); *B32B 27/10* (2013.01); *B32B 27/12* (2013.01); *B32B 27/32* (2013.01); *B32B 29/005* (2013.01); *B32B 29/02* (2013.01); *C08G 18/10* (2013.01); *C08G 18/5021* (2013.01); *C08G 18/71* (2013.01); *C08G 18/73* (2013.01); *C08G 18/76* (2013.01); *C09J 175/00* (2013.01); *B32B 2255/10* (2013.01); *B32B 2255/205* (2013.01); *B32B 2307/306* (2013.01); *B32B 2307/4026* (2013.01); *B32B 2307/714* (2013.01); *B32B 2439/70* (2013.01); *B32B 2597/00* (2013.01)

(58) Field of Classification Search
None
See application file for complete search history.

(56) References Cited

U.S. PATENT DOCUMENTS 3,840,419 A * 10/1974 De Keyser .............. B32B 27/00
156/307.3
3,886,122 A   5/1975 Fabris et al.
(Continued)

FOREIGN PATENT DOCUMENTS

WO    2008/094238 A1    8/2008

OTHER PUBLICATIONS

PCT/US2017/029290, International Search Report and Written Opinion dated Jul. 17, 2017.
(Continued)

*Primary Examiner* — Michael J Feely

(57) ABSTRACT

A two-component solventless adhesive composition is disclosed, the adhesive composition comprising an isocyanate component comprising at least one isocyanate, and a polyol component comprising at least one amine-initiated polyol having a functionality of from 3 to 8 and a hydroxyl number of from 20 to 1,000. Further, a method for forming a laminate is disclosed, the method comprising forming a solventless adhesive composition comprising an amine-initiated polyol, applying a layer of the adhesive composition to a surface of a film, bringing the layer into contact with a surface of another film to form a laminate, and curing the adhesive composition. Still further, a laminate formed by the method is disclosed.

16 Claims, 2 Drawing Sheets

(51) Int. Cl.
  *B32B 27/10* (2006.01)
  *B32B 21/08* (2006.01)
  *C09J 175/00* (2006.01)
  *B32B 15/12* (2006.01)
  *B32B 15/08* (2006.01)
  *B32B 5/02* (2006.01)

(56) References Cited

U.S. PATENT DOCUMENTS

| | | | |
|---|---|---|---|
| 4,171,419 A | 10/1979 | Meyer et al. | |
| 4,923,756 A | 5/1990 | Chung et al. | |
| 5,134,216 A | 7/1992 | Jansen et al. | |
| 5,164,473 A | 11/1992 | Dormish et al. | |
| 5,562,148 A | 10/1996 | Schneider | |
| 5,614,575 A * | 3/1997 | Kotschwar | C08G 18/482 524/270 |
| 5,672,229 A | 9/1997 | Konig et al. | |
| 5,981,683 A | 11/1999 | Gillis et al. | |
| 7,855,240 B2 | 12/2010 | Schmidt et al. | |
| 8,609,579 B2 | 12/2013 | Harvey et al. | |
| 8,937,107 B2 | 1/2015 | Singh et al. | |
| 9,064,806 B1 | 6/2015 | Qian et al. | |
| 9,067,842 B2 | 6/2015 | Neff et al. | |
| 2004/0138402 A1 | 7/2004 | Thiele et al. | |
| 2006/0078741 A1 | 4/2006 | Ramalingam | |
| 2008/0099141 A1 | 5/2008 | Booth et al. | |
| 2010/0297427 A1 | 11/2010 | Schlingloff et al. | |
| 2012/0295104 A1 | 11/2012 | Barker | |
| 2013/0078473 A1 | 3/2013 | Kollbach et al. | |
| 2015/0096503 A1 | 4/2015 | Dugan et al. | |
| 2016/0090515 A1 | 3/2016 | Roock et al. | |
| 2016/0298009 A1 | 10/2016 | Dey et al. | |
| 2018/0044462 A1 | 2/2018 | Blodau et al. | |
| 2019/0177575 A1 * | 6/2019 | Wu | B32B 5/024 |
| 2019/0202172 A1 * | 7/2019 | Schmidt | B32B 5/022 |
| 2019/0390094 A1 * | 12/2019 | Wu | C08G 18/10 |
| 2019/0390095 A1 * | 12/2019 | Vinci | C08G 18/3278 |

OTHER PUBLICATIONS

PCT/US2017/029290, International Preliminary Report on Patentability dated Nov. 13, 2018.

* cited by examiner

TWO-COMPONENT SOLVENTLESS ADHESIVE COMPOSITIONS COMPRISING AN AMINE-INITIATED POLYOL

REFERENCE TO RELATED APPLICATIONS

The present application claims the benefit of U.S. Provisional Application No. 62/333,877, filed on May 10, 2016.

FIELD OF THE DISCLOSURE

The instant disclosure relates to solventless adhesive compositions. More particularly, the disclosure relates to two-component solventless polyurethane adhesive compositions premixed prior to application for use with fabrication of laminates, the compositions having improved conversion efficiency, bond strength, chemical and thermal resistance, and primary aromatic amine and isocyanate decay. The disclosure further relates to methods of forming laminate structures comprising the disclosed adhesive compositions.

BACKGROUND OF THE DISCLOSURE

Adhesive compositions are useful for a wide variety of purposes. For instance, adhesive compositions are used to bond together substrates such as polyethylene, polypropylene, polyester, polyamide, metal, paper, or cellophane to form composite films, i.e., laminates. The use of adhesives in different end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive can vary by category and by the application in which the adhesive is applied.

Solventless laminating adhesives can be applied up to 100% solids without either organic solvents or an aqueous carrier. Because no organic solvent or water has to be dried from the adhesive upon application, these adhesives can be run at high line speeds. Solvent and water-based laminating adhesives are limited by the rate at which the solvent or water can be effectively dried and removed from the laminate structure after application of the adhesive. For environmental, health, and safety reasons, laminating adhesives are preferably aqueous or solventless.

Within the category of solventless laminating adhesives, there are many varieties. One particular variety includes two-component polyurethane-based laminating adhesives premixed prior to application, referred to herein as "premixed two-component adhesives." Typically, a two-component polyurethane-based laminating adhesive includes a first component comprising an isocyanate-containing prepolymer and/or a polyisocyanate and a second component comprising a polyol. The prepolymer is obtained by the reaction of excess isocyanate with a polyether and/or polyester containing two or more hydroxyl groups per molecule. The second component is a polyether and/or polyester functionalized with two or more hydroxyl groups per molecule. The two components are combined in a predetermined ratio, or "premixed," and then applied on a substrate, which is then laminated to another substrate.

Two-component solventless polyurethane-based laminating adhesives, compared to traditional solvent-containing adhesives, include weak initial bonds and slow bond development before the laminate can be processed. In addition, these adhesives tend to exhibit poor chemical resistance, especially in acidic conditions. Still more, conventional two-component solventless polyurethane-based laminating adhesives exhibit slow primary aromatic amine and isocyanate decay and, therefore, lower conversion efficiency. Further, catalysts are widely used in polyurethane chemistry to speed up the reaction of isocyanates and hydroxyl terminated compounds. Typical catalysts include amine catalysts, metal catalysts, blocked amine and metal catalysts, and microencapsulated amine and metal catalysts. These catalysts can be very effective, but they are not ideally suited for food contact applications. This is because small molecule amine and metal catalysts can potentially migrate into food, which can be a concern from a food safety standpoint. In addition, small amine catalysts often possess strong odor that can alter the taste of food, making them not desirable for direct or indirect food contact applications.

Accordingly, two-component solventless polyurethane-based laminating adhesive compositions with improved bond strength and faster developing bonds, improved chemical and thermal resistance, and faster primary aromatic amine and isocyanate decay, are desirable. Still further, two-component solventless polyurethane-based laminating adhesive compositions not requiring the use of a catalyst to speed up the isocyanate and polyol reaction are desirable.

SUMMARY OF THE DISCLOSURE

Two-component solventless polyurethane adhesive compositions are disclosed. In some embodiments, the solventless adhesive composition comprises an isocyanate component comprising at least one isocyanate. The solventless adhesive composition further comprises a polyol component comprising at least one amine-initiated polyol. The at least one isocyanate can be selected from the group consisting of an aromatic isocyanate, an aliphatic isocyanate, a cycloaliphatic isocyanate, and combinations thereof. The at least one amine-initiated polyol can be the reaction product of an alkylene oxide and an amine. The amine-initiated polyol can further comprise a functionality of from 3 to 8 and a hydroxyl number of from 20 to 1,000. The polyol component can further comprise a non-amine-initiated polyol.

A method for forming a laminate is also disclosed. In some embodiments, the method comprises forming a two-component solventless adhesive composition by premixing the two components, applying a layer of the adhesive composition to a surface of a first substrate, bringing the layer into contact with a surface of a second substrate to form a laminate, and curing the adhesive composition. A laminate formed by this method is also disclosed.

BRIEF DESCRIPTION OF THE DRAWINGS

Reference is made to the accompanying drawings in which.

DETAILED DESCRIPTION OF THE DISCLOSURE

Figure 1:
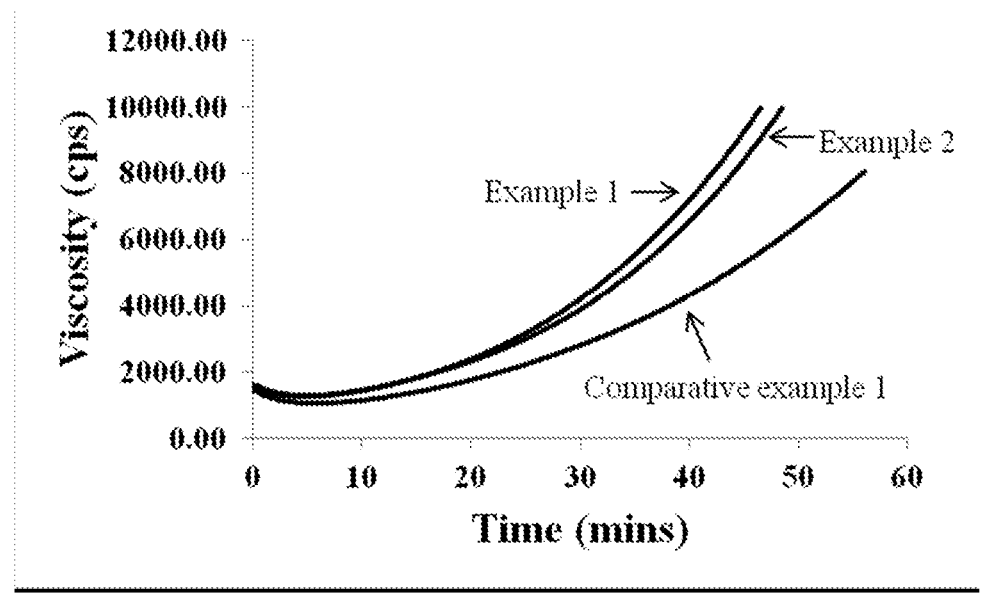
FIG. 1 is a plot illustrating the viscosity of Comparative Example 1 and Illustrative Examples 1 and 2 versus time.

The two-component solventless adhesive composition according to this disclosure comprises an isocyanate component and a polyol component.

Isocyanate Component

The isocyanate component comprises at least one isocyanate. The at least one isocyanate can be selected from the group consisting of an isocyanate prepolymer, an isocyanate monomer, a polyisocyanate (e.g., dimers, trimmers, etc.), and combinations of two or more thereof. As used herein, a "polyisocyanate" is any compound that contains two or more isocyanate groups. The isocyanate prepolymer is the reaction product of reactants comprising at least one isocyanate and at least one polyol. As used herein, the "isocyanate prepolymer" can be a polyisocyanate itself.

The at least one isocyanate can be selected from the group consisting of an aromatic isocyanate, an aliphatic isocyanate, a cycloaliphatic isocyanate, and combinations of two or more thereof. An "aromatic polyisocyanate" is a polyisocyanate that contains one or more aromatic rings. An "aliphatic polyisocyanate" contains no aromatic rings. A "cycloaliphatic polyisocyanate" is a subset of aliphatic polyisocyanates, wherein the chemical chain is ring-structured.

Examples of aromatic isocyanates suitable for use according to the disclosure include, but are not limited to, isomers of methylene diphenyl diisocyanate ("MDI"), such as 4,4-MDI, 2,2-MDI and 2,4-MDI, isomers of toluene-diisocyanate ("TDI") such as 2,4-TDI, 2,6-TDI, isomers of naphthalene-diisocyanate ("NDI") such as 1,5-NDI, isomers of norbornane diisocyanate ("NBDI"), isomers of tetramethylxylylene diisocyanate ("TMXDI"), and combinations of two or more thereof. Preferred are isomers of MDI, particularly a mixture of 4,4-MDI and 2,4-MDI (i.e., liquid MDI) or 4,4-MDI (i.e., solid MDI).

Examples of aliphatic and cycloaliphatic isocyanates suitable for use according to the disclosure include, but are not limited to, isomers of hexamethylene diisocyanate ("HDI"), isomers of isophorone diisocyanate ("IPDI"), isomers of xylene diisocyanate ("XDI"), and combinations thereof.

Compounds having isocyanate groups, such as the isocyanate component, may be characterized by the parameter "% NCO," which is the amount of isocyanate groups by weight based on the weight of the compound. The parameter % NCO is measured by the method of ASTM D 2572-97 (2010). The disclosed isocyanate component has a % NCO of at least 1 wt %, or at least 5 wt %, or at least 10 wt %. Preferably the isocyanate component has a % NCO not to exceed 30 wt %, or 25 wt %, or 20 wt %.

Preferably the isocyanate component has viscosity at 25° C. of 300 mPa-s to 12,000 mPa-s, as measured by the method of ASTM D2196.

Polyol Component

The solventless adhesive composition further comprises a polyol component comprising at least one amine-initiated polyol. In some embodiments, the polyol component can also comprise another type of polyol which is a non-amine-initiated polyol. Each polyol type may include one kind of polyol. Alternatively, each polyol type may include mixtures of different kinds of polyols. In some embodiments, one polyol type may be one kind of polyol whereas the other polyol type may be a mixture of different kinds of polyols. In some embodiments, the at least one amine-initiated polyol accounts for 0.5 to 12 wt % of the polyol component, based on the total weight of the polyol component.

The at least one amine-initiated polyol improves the reactivity of the adhesive composition system. In particular, the at least one amine-initiated polyol is a hydroxyl terminated molecule and, as a result, becomes part of the polyurethane polymer network formed by the reaction of the isocyanate and polyol components. As a result, the concern of migration of small molecules (e.g., a catalyst) is eliminated.

The at least one amine-initiated polyol comprises a functionality of from 3 to 8, or from 4 to 7, or from 5 to 6. As used herein, "functionality" refers to the number of isocyanate reactive sites per molecule. Further, the at least one amine-initiated polyol comprises a hydroxyl number of from 20 to 1,000, or from 200 to 900, or from 750 to 850. As used herein, "hydroxyl number" is a measure of the amount of reactive hydroxyl groups available for reaction. This number is determined in a wet analytical method and is reported as the number of milligrams of potassium hydroxide equivalent to the hydroxyl groups found in one gram of the sample. The most commonly used methods to determine hydroxyl number are described in ASTM D 4274 D. Still further, the at least one amine-initiated polyol comprises a molecular weight not to exceed 12,000 g/mol, or not to exceed 8,000 g/mol, or not to exceed 5,000 g/mol.

Amine-initiated polyols suitable for use according to this disclosure are made by alkoxylating one or more amine initiators with one or more alkylene oxides. Suitable amine initiators include, but are not limited to, toluene diamine, methylamine, ethylenediamine, diethylenetriamine, aniline, aminoethylethanolamine, bis-3-aminopropylmethylamine, propylenediamine, tetra- or hexamethyleneamine, triethanolamine, phenylenediamine, and combinations of two or more thereof. Suitable alkylene oxides include, but are not limited to, ethylene oxide, propylene oxide, 1,2-butylene oxide, and combinations of two or more thereof.

The amount of the at least one amine-initiated polyol in the premixed adhesive composition is, by weight based on the weight of the premixed adhesive composition (i.e., the total weight of the isocyanate component and the polyol component), at least 0.5 wt %, or at least 0.7 wt %, or at least 6 wt %. The amount of the at least one amine-initiated polyol in the premixed adhesive composition is, by weight based on the weight of the adhesive composition, not to exceed 25 wt %, or not to exceed 15 wt %, or not to exceed 10 wt %.

The amount of the at least one amine-initiated polyol in the adhesive composition depends on the reactivity of the at least one isocyanate used. In general, relatively less amine-initiated polyol is required for aromatic isocyanate-based adhesives compared to aliphatic isocyanate-based systems.

It is contemplated that the isocyanate component and the polyol component of the disclosed solventless adhesive composition can be made separately and, if desired, stored until it is desired to use the premixed adhesive composition. Preferably, both the isocyanate component and the polyol component are each liquid at 25° C. In some embodiments, when it is desired to use the adhesive composition, the isocyanate component and the polyol component are brought into contact with each other and mixed together. It is contemplated that when these two components are brought into contact, a curing reaction begins in which the isocyanate groups react with the hydroxyl groups to form urethane links. The adhesive composition formed by bringing the two components into contact can be referred to as a "curable mixture."

The time required for the curable mixture to cure is, preferably, as short as necessary to achieve sufficient bond strength. This is because shorter cure times enhance the efficiency of the laminate formation process. Traditionally, aliphatic isocyanates are not preferred because they are less reactive than aromatic isocyanates, resulting in longer cure times. However, the disclosed adhesive compositions achieve relatively short cure times even when the isocyanate component comprises aliphatic isocyanates.

In some embodiments, one or more non-amine-initiated polyols may optionally be included in the adhesive composition. Examples of the non-amine-initiated polyol include, but are not limited to, polyester polyols, polyether polyols, polycarbonate polyols, polyacrylate polyols, polycaprolactone polyols, polyolefin polyols, natural oil polyols, and combinations of two or more thereof. Preferably the non-amine-initiated polyol has viscosity at 25° C. of 10 mPa-s to 40,000 mPa-s, as measured by the method of ASTM D2196.

The amount of the at least one non-amine-initiated polyol in the premixed adhesive composition is at least 10 wt %, or at least 20 wt %, or at least 30 wt %, based on the weight of the adhesive composition. The amount of the at least one non-amine-initiated polyol in the premixed adhesive composition is not to exceed 60 wt %, or not to exceed 50 wt %, or not to exceed 40 wt %, based on the weight of the adhesive composition.

Preferably, the stoichiometric ratio of the isocyanate component to the polyol component is 1:1 or higher, such as 1.2:1 or higher, or such as 1.4:1 or higher. Preferably, the stoichiometric ratio of the isocyanate component to the polyol component is 3:1 or lower, such as 2.5:1 or lower, or such as 2:1 or lower. In general, the ratio of isocyanate component to polyol component for industrial applications (e.g., pipes) can be relatively higher than the ratio for consumer goods applications (e.g., food packaging) where migration of isocyanate from adhesives to food is a safety concern.

In some embodiments, one or more additives can optionally be included in the adhesive composition. Examples of such additives include, but are not limited to, tackifiers, plasticizers, rheology modifiers, adhesion promoters, antioxidants, fillers, colorants, surfactants, catalysts, solvents, and combinations of two or more thereof.

In some embodiments, one or more catalysts can optionally be included in the adhesive composition.

A method of forming a laminate using an adhesive composition is also disclosed. Preferably, the adhesive composition, such as an adhesive composition comprising the mixed isocyanate and polyol components discussed above, is in a liquid state at 25° C. Even if the composition is solid at 25° C., it is acceptable to heat the composition as necessary to put it in a liquid state. A layer of the composition is applied to a surface of a first substrate, such as a film. A "film" is any structure that is 0.5 mm or less in one dimension and is 1 cm or more in both of the other two dimensions. A polymer film is a film that is made of a polymer or mixture of polymers. The composition of a polymer film is, typically, 80 percent by weight or more by weight one or more polymers. Preferably, the thickness of the layer of the curable adhesive mixture is 1 to 5 μm.

A surface of a second substrate or film is brought into contact with the layer of the curable mixture to form an uncured laminate. The uncured laminate may be subjected to pressure, for example by passing through nip rollers, which may or may not be heated. The uncured laminate may be heated to speed the cure reaction. However, the uncured laminate can reach full cure within two to three days at ambient temperature for aromatic isocyanate-based adhesives, or one to two weeks in the case of aliphatic isocyanate-based adhesives.

Suitable substrates include films such as paper, woven and nonwoven fabric, metal foil, polymers, and metal-coated polymers. Films optionally have a surface on which an image is printed with ink; the ink may be in contact with the adhesive composition.

Examples of the Disclosure

The present disclosure will now be explained in further detail by showing Illustrative Examples and Comparative Examples (collectively, "the Examples"). However, the scope of the present disclosure is not, of course, limited to the Examples.

The raw materials for use in the Illustrative Examples ("IE") and Comparative Examples ("CE") are detailed in Table 1 below.

TABLE 1

Raw Materials

| Material | Commercial Name | Chemical Nature | Commercial Supplier |
|---|---|---|---|
| Component A | MOR-FREE ™ 698A | Aromatic polyisocyanate | The Dow Chemical Co. |
| Component B | MOR-FREE ™ C-33 | Aliphatic polyisocyanate | The Dow Chemical Co. |
| Component C | MOR-FREE ™ C-79 | Hydroxyl-terminated component | The Dow Chemical Co. |
| Component F | MOR-FREE ™ 225 | Hydroxyl-terminated component | The Dow Chemical Co. |
| Component D | VORANOL ™ 800 | Amine-initiated polyol | The Dow Chemical Co. |
| Component E | VORANOL ™ RA640 | Amine-initiated polyol | The Dow Chemical Co. |

Examples comprising aromatic isocyanates are prepared according to formulations listed in Table 2 using the raw materials listed in Table 1.

TABLE 2

Adhesive formulation of aromatic isocyanate-based systems

| | Formulation (wt % basis) | | | |
|---|---|---|---|---|
| Ingredient | CE1 | IE1 | IE2 | IE3 |
| Component A | 65.8 | 66.7 | 66.4 | 68.1 |
| Component C | 34.2 | 32.6 | 32.9 | 30.3 |
| Component D | 0 | 0.7 | 0 | 1.6 |
| Component E | 0 | 0 | 0.7 | 0 |
| TOTAL | 100 | 100 | 100 | 100 |

Examples comprising aliphatic isocyanates are prepared according to formulations listed in Table 3 using the raw materials listed in Table 1.

TABLE 3

Adhesive formulation of the aliphatic isocyanate-based system

| Ingredient | Formulation (wt % basis) | | |
|---|---|---|---|
| | CE2 | IE4 | IE5 |
| Component B | 50 | 56.8 | 60.5 |
| Component F | 50 | 37.1 | 30.3 |
| Component D | 0 | 6.1 | 9.2 |
| TOTAL | 100 | 100 | 100 |

Example 1 ("IE1")

A polyurethane adhesive composition comprising about 66.7 wt % Component A, 32.6 wt % Component C, and 0.7 wt % Component D is mixed at a stoichiometric ratio of 1.0:1.4 (OH/NCO). The viscosity buildup of this formulated adhesive is measured on a Brookfield DV-II viscometer at 40° C. This adhesive is used to bond a polyethylene terephthalate ("PET")/foil structure, a foil/polyethylene ("PE") structure, and a PET/PE structure. The produced laminates are cured at 22° C. and 50% relative humidity. The laminate samples are cut to 25.4 mm wide strips and their T-peel bond strength is evaluated on Thwing-Albert peel tester at 10 inch/min. If one of the substrates are stretched or torn, the maximum force or force at break is recorded. The average of the force during the test is recorded if the two substrates are separated. The bond strength values are the average of at least three sample strips. Boil-in-bag testing is conducted for the PET/PE laminate after 14 days curing, including DI water and 1:1:1 sauce simulants (i.e., equal parts of vinegar, corn oil, and ketchup). The pouches for the boil-in-bag testing have an interior size of 4 inch by 6 inch and are filled with 100 ml of water or 1:1:1 sauce. Subsequently, they are placed in the boiling water for 30 minutes. When complete, at least three 25.4 mm wide strips are cut from the area in contact with the boiling water and their bond strength is measured on Thwing-Albert peel tester, using the same method discussed above.

Example 2 ("IE2")

A polyurethane adhesive composition comprising about 66.4 wt % Component A, 32.9 wt % Component C, and 0.7 wt % Component E is mixed at a stoichiometric ratio of 1.0:1.4 (OH/NCO). The viscosity buildup of this formulated adhesive is measured on a Brookfield DV-II viscometer at 40° C. This adhesive is used to bond a PET/PE structure. The produced laminate is cured at 22° C. and 50% relative humidity and its bond strength was subsequently evaluated on a Thwing-Albert peel tester at 10 inch/min Boil-in-bag testing is conducted for the PET/PE laminate after 14 days curing, including DI water and 1:1:1 sauce simulants (i.e., equal parts of vinegar, corn oil, and ketchup).

Example 3 ("IE3")

A polyurethane adhesive composition comprising about 68.1 wt % Component A, 30.3 wt % Component C, and 1.6 wt % Component D is mixed at a stoichiometric ratio of 1.0:1.4 (OH/NCO). The viscosity buildup of this formulated adhesive is measured on a Brookfield DV-II viscometer at 40° C. This adhesive is used to bond PET/foil structure and a foil/PE structure. The produced laminates are cured at 22° C. and 50% relative humidity and their bond strength is subsequently evaluated on a Thwing-Albert peel tester at 10 inch/min.

Comparative Example 1 ("CE1")

A polyurethane adhesive composition comprising about 65.8 wt % Component A and 34.2 wt % Component C is mixed at a stoichiometric ratio of 1.0:1.4 (OH/NCO). The viscosity buildup of this formulated adhesive is measured on a Brookfield DV-II viscometer at 40° C. This adhesive is used to bond a PET/foil structure, a foil/PE, and a PET/PE structure. The produced laminates are cured at 22° C. and 50% relative humidity and their bond strength is evaluated on a Thwing-Albert peel tester at 10 inch/min. Boil-in-bag testing is conducted for the PET/PE laminate after 14 days curing, including DI water and 1:1:1 sauce simulants (i.e., equal parts of vinegar, corn oil, and ketchup). The pouches for this test have an interior size of 4 inch by 6 inch and are filled with 100 ml of water or 1:1:1 sauce. Subsequently, they are placed in the boiling water for 30 minutes. When complete, at least three 25.4 mm wide strips are cut from the area in contact with the boiling water and their bond strength is measured on Thwing-Albert peel tester, using the same method discussed above.

Example 4 ("IE4")

A polyurethane adhesive composition comprising about 37.1 wt % Component F, 56.8 wt % Component B, and 6.1 wt % Component D is mixed at a stoichiometric ratio of 1.0:1.2 (OH/NCO). The viscosity buildup of this formulated adhesive is measured on an AR-2000 rheometer at 40° C. This adhesive is used to bond a PET/PE structure and a foil/cast polypropylene ("CPP") structure. The produced laminates are cured at 40° C. and 22% relative humidity and their bond strength is evaluated on a Thwing-Albert peel tester at 10 inch/min.

Example 5 ("IE5")

A polyurethane adhesive composition comprising about 30.3 wt % Component F, 60.5 wt % Component B, and 9.2 wt % Component D is mixed at a stoichiometric ratio of 1.0:1.2 (OH/NCO). The viscosity buildup of this formulated adhesive is measured on an AR-2000 rheometer at 40° C. This adhesive is used to bond a PET/PE structure and a foil/CPP structure. The produced laminates are cured at 40° C. and 22% relative humidity and their bond strength is evaluated on a Thwing-Albert peel tester at 10 inch/min.

Comparative Example 2 ("CE2")

A polyurethane adhesive composition comprising about 50 wt % Component F and 50 wt % Component B is mixed at a stoichiometric ratio of 1.0:1.2 (OH/NCO). The viscosity buildup of this formulated adhesive is measured on an AR-2000 rheometer at 40° C. This adhesive is used to bond a PET/PE structure and a foil/CPP structure. The produced laminates are cured at 40° C. and 22% relative humidity and their bond strength is evaluated on a Thwing-Albert peel tester at 10 inch/min.

Figure 2:
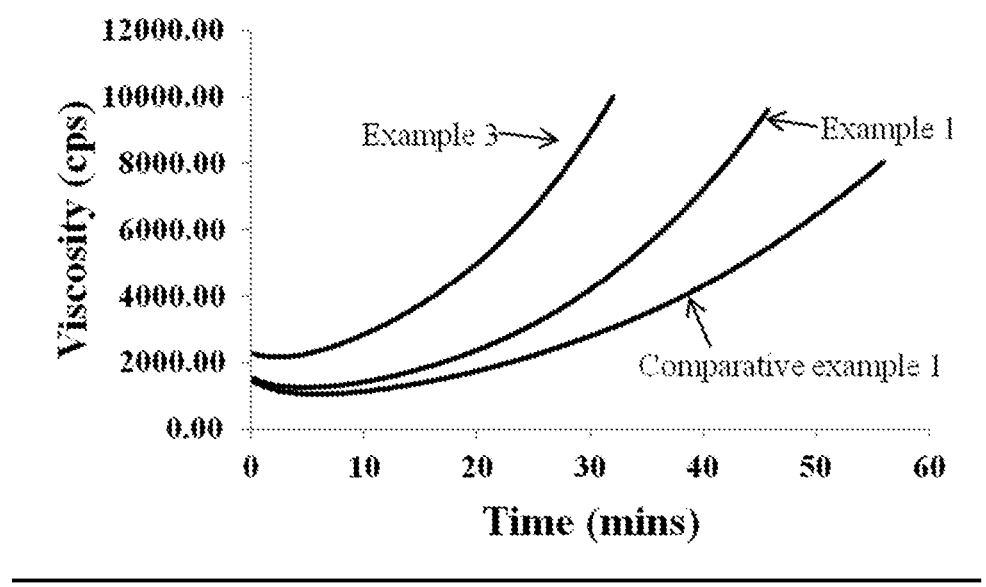
FIG. 2 is a plot illustrating the viscosity of Comparative Example 1 and Illustrative Examples 1 and 3 versus time.
Figure 3:
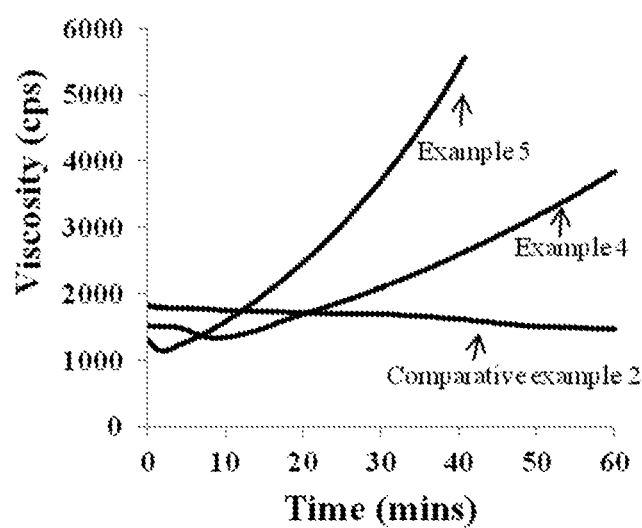
FIG. 3 is a plot illustrating the viscosity of Comparative Example 2 and Illustrative Examples 4 and 5 versus time.

FIGS. 1, 2, and 3 show that the curing rate of a polyurethane laminating adhesive is relatively accelerated by incorporating the disclosed amine-initiated polyols. For example, and as illustrated in FIG. 1, the viscosity of CE1 reaches 4,000 cps by 38 minutes whereas IE1 and IE2, with addition of small amounts of Component D and RA640, achieve 4,000 cps by 29 and 30 minutes, respectively. Further for example, and as illustrated in FIG. 2, the viscosity of the formulated adhesive is built up faster with increased Component D. CE2, an aliphatic isocyanate based system, exhibits a relatively low curing rate and its viscosity does not change much within an hour, as shown in FIG. 3. IE4 and IE5, on the other hand, exhibit faster curing properties.

TABLE 4

Bond strength data of aliphatic isocyanate-based laminates

| | Bond strength (g/inch) at 3.5 hours | |
|---|---|---|
| Adhesive | PET/PE | Foil/CPP |
| CE2 | 2 ± 0 | 1 ± 0 |
| IE4 | 12 ± 1.7 | 24 ± 1.5 |
| IE5 | 233 ± 22.3 | 287 ± 42.9 |

TABLE 5

Bond strength data of PET/Foil laminates based on aromatic isocyanate

| | Bond Strength (g/inch) | | | | | | | |
|---|---|---|---|---|---|---|---|---|
| Adhesive | 3.5 hour | | 22 hour | | 3 day | | 7 day | |
| CE1 | 69 ± 3.9 | AS | 264 ± 40.8 | AS | 319 ± 14.8 | AS | 305 ± 33.8 | AS |
| IE1 | 90 ± 5.4 | AS | 378 ± 53.0 | AS | 381 ± 18.1 | AS | 436 ± 45.6 | FT |
| IE3 | 209 ± 29.6 | AS | 438 ± 41.4 | FT | 482 ± 33.2 | FT | 472 ± 27.0 | FT |

*"AS": Adhesive Split; "FT": Film Tear

TABLE 6

Bond strength data of Foil/PE laminates based on aromatic isocyanate

| | Bond Strength (g/inch) | | | | | | | |
|---|---|---|---|---|---|---|---|---|
| Adhesive | 3.5 hour | | 22 hour | | 3 day | | 7 day | |
| CE1 | 128 ± 7.9 | AS | 826 ± 32.2 | AS | 1045 ± 125.4 | AS | 960 ± 92.1 | AS |
| IE1 | 229 ± 5.3 | AS | 1081 ± 39.8 | AS | 844 ± 119.0 | AS | 831 ± 76.8 | AS |
| IE3 | 241 ± 12.5 | AS | 1006 ± 51.5 | AS | 767 ± 88.8 | AS | 798 ± 31.4 | AS |

*"AS": Adhesive Split; "FT": Film Tear

Tables 4-6 illustrate that incorporating amine-initiated polyols in the adhesive compositions greatly accelerates bond strength development of laminates, especially for an aliphatic isocyanate based system. The data in Table 4 relates to a PET/PE and foil/CPP laminates. The data in Table 5 relates to a PET/foil laminate having an aliphatic isocyanate-based adhesive. Table 6 relates to a foil/PE laminate having an aromatic isocyanate-based adhesive. The failure mode of the PET/foil structure, detailed in Table 5, is noticeably changed from adhesive split to film tear, and the 7-day bond strength of IE1 and IE3 were also higher than that of CE1.

TABLE 7

Bond strength data of PET/PE laminates after boil-in-bag test

| | Bond strength (g/inch) | | | |
|---|---|---|---|---|
| Adhesive | Boil in bag (water simulant) | | Boil in bag (1:1:1 sauce simulant) | |
| CE 1 | 654 | FT | 408 | AT |
| IE1 | 471 | FT | 520 | AT |
| IE2 | 661 | FT | 660 | FT |

* "AT": Adhesive transfer; "FT": Film Tear

As shown in Table 7, incorporating amine-initiated polyols in IE1 and IE2 did not sacrifice the performance as compared to CE1. In fact, the chemical resistance of IE1 and IE2 was even improved.

The invention claimed is:

1. A premixed two-component solventless adhesive composition, comprising:
    an isocyanate component comprising at least one isocyanate; and
    a polyol component comprising at least one amine-initiated polyol having a functionality of from 3 to 8 and a hydroxyl number of from 750 to 1,000, wherein the at least one amine-initiated polyol accounts for 0.5 to 12 wt % of the polyol component, based on the total weight of the polyol component.

2. The two-component solventless adhesive composition of claim 1, wherein the at least one isocyanate is selected from the group consisting of a monomeric isocyanate, a polymeric isocyanate, an isocyanate prepolymer, and combinations of two or more thereof.

3. The two-component solventless adhesive composition of claim 1, wherein the at least one isocyanate is selected from the group consisting of hexamethylene diisocyanate ("HDI") and isomers thereof, isophorone diisocyanate ("IPDI") and isomers thereof, norbornane diisocyanate ("NBDI") and isomers thereof, tetramethylxylylene diisocyanate ("TMXDI") and isomers thereof, xylylene diisocyanate ("XDI") and isomers thereof, toluene diisocyanate ("TDI") and isomers thereof, diphenylmethane diisocyanate ("MDI") and isomers thereof, isocyanate prepolymers thereof, and combinations of two or more thereof.

4. The two-component solventless adhesive composition of claim 1, wherein the at least one amine-initiated polyol is the reaction product of a C1-C6 alkylene oxide and an amine.

5. The two-component solventless adhesive composition of claim 4, wherein the amine is selected from the group consisting of toluene diamine, methylamine, ethylenediamine, diethylenetriamine, aniline, aminoethylethanolamine, bis-3-aminopropylmethylamine, propylenediamine, tetra-or hexamethyleneamine, triethanolamine, phenylenediamine, and combinations of two or more thereof.

6. The two-component solventless adhesive composition of claim 1, the polyol component further comprising at least one non-amine-initiated polyol selected from the group consisting of a polyester polyol, a polyether polyol, a polycarbonate polyol, a polyacrylate polyol, a polycaprolactone polyol, a polyolefin polyol, a natural oil polyol, and combinations of two or more thereof.

7. The two-component solventless adhesive composition of claim 1, further comprising an additive selected from the group consisting of a tackifier, a plasticizer, a rheology modifier, an adhesion promoter, an antioxidant, a filler, a colorant, a surfactant, a catalyst, and combinations of two or more thereof.

8. The two-component solventless adhesive composition of claim 1, wherein the stoichiometric ratio of the isocyanate component to the polyol component is from 3:1 to 1:1.

9. A method for forming a laminate, comprising:
forming a solventless adhesive composition by mixing reactants comprising:
an isocyanate component comprising at least one isocyanate; and
a polyol component comprising at least one amine-initiated polyol having a functionality of from 3 to 8 and a hydroxyl number of from 750 to 1,000, wherein the at least one amine-initiated polyol accounts for 0.5 to 12 wt % of the polyol component, based on the total weight of the polyol component;
applying a layer of the adhesive composition to a surface of a first substrate;
bringing the layer into contact with a surface of a second substrate to form a laminate; and
curing the adhesive composition.

10. The method for forming a laminate of claim 9, wherein the at least one amine-initiated polyol is the reaction product of a C1-C6 alkylene oxide and an amine.

11. The method for forming a laminate of claim 10, wherein the alkylene oxide is selected from the group consisting of ethylene oxide, propylene oxide, 1,2-butylene oxide, and combinations of two or more thereof.

12. The method for forming a laminate of claim 10, wherein the amine is selected from the group consisting of toluene diamine, methylamine, ethylenediamine, diethylenetriamine, aniline, aminoethylethanolamine, bis-3-aminopropylmethylamine, propylenediamine, tetra-or hexamethyleneamine, triethanolamine, phenylenediamine, and combinations of two or more thereof.

13. The method for forming a laminate of claim 9, the polyol component further comprising at least one non-amine-initiated polyol selected from the group consisting of a polyester polyol, a polyether polyol, a polycarbonate polyol, a polyacrylate polyol, a polycaprolactone polyol, a polyolefin polyol, a natural oil polyol, and combinations of two or more thereof.

14. The method for forming a laminate of claim 9, further comprising adding an additive to the adhesive composition, the additive selected from the group consisting of a tackifier, a plasticizer, a rheology modifier, an adhesion promoter, an antioxidant, a filler, a colorant, a surfactant, a catalyst, and combinations of two or more thereof.

15. The method for forming a laminate of claim 9, wherein the first substrate and second substrate are each selected from the group consisting of wood, metal, plastics, composite materials, paper, fabric, and combinations of two or more thereof.

16. A laminate formed by the method of claim 9.

* * * * *